(12) United States Patent
Huott et al.

(10) Patent No.: US 7,129,764 B2
(45) Date of Patent: Oct. 31, 2006

(54) SYSTEM AND METHOD FOR LOCAL GENERATION OF A RATIO CLOCK

(75) Inventors: William V. Huott, Holmes, NY (US); Timothy G. McNamara, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 11/056,024

(22) Filed: Feb. 11, 2005

(65) Prior Publication Data

US 2006/0181326 A1    Aug. 17, 2006

(51) Int. Cl.
*G06F 1/04* (2006.01)
(52) U.S. Cl. ...................... 327/291; 327/299
(58) Field of Classification Search ............... None
See application file for complete search history.

(56) References Cited

U.S. PATENT DOCUMENTS

| | | | |
|---|---|---|---|
| 4,996,696 A * | 2/1991 | McCabe .................. 375/249 |
| 5,448,715 A * | 9/1995 | Lelm et al. ............... 713/600 |
| 6,189,082 B1 * | 2/2001 | Ramamurthy .............. 711/202 |
| 6,229,328 B1 * | 5/2001 | Lueders ................... 324/765 |
| 6,340,878 B1 * | 1/2002 | Oglesbee .................. 320/150 |
| 6,489,817 B1 * | 12/2002 | Wong et al. ............... 327/115 |
| 6,535,946 B1 * | 3/2003 | Bryant et al. .............. 710/305 |
| 6,724,850 B1 * | 4/2004 | Hartwell ................... 375/376 |
| 6,750,693 B1 * | 6/2004 | Duewer .................... 327/298 |
| 6,877,145 B1 * | 4/2005 | Boylan et al. .............. 716/12 |
| 6,954,869 B1 * | 10/2005 | Syed ....................... 713/400 |
| 6,956,918 B1 * | 10/2005 | Chen et al. ................ 375/354 |

* cited by examiner

*Primary Examiner*—Quan Tra
*Assistant Examiner*—Cassandra Cox
(74) *Attorney, Agent, or Firm*—Cantor Colburn LLP

(57) ABSTRACT

A system for locally generating a ratio clock from a global clock based on a global clock gate signal includes a staging unit, a pass gate, and a state machine. The state machine is electrically connected to an output of the staging unit and an input of the pass gate. The state machine includes state elements and associated logic. The associated logic is configured to allow said state elements to pass through a number of logic states for every same number of consecutive edges of the global clock when the associated logic is enabled. The number is a positive integer.

20 Claims, 4 Drawing Sheets

SYSTEM AND METHOD FOR LOCAL GENERATION OF A RATIO CLOCK

BACKGROUND OF THE INVENTION

1. Field of the Invention

This invention relates to generating a ratio clock signal using a global clock signal. More particularly, this invention relates to generating a ratio clock signal at any integer divided by two of a global clock signal.

2. Description of Background

It is common for an integrated circuit chip (chip) to operate with multiple different clock speeds. Often, chip architecture allows different regions of the chip to have different clock speeds. To achieve multiple different clock speeds, a chip may employ multiple clock grids throughout the entire chip with each clock grid producing a distinct clock speed. However, employing multiple clock grids creates additional expense for chip production. Thus, to keep costs down, it has been common practice to use a single clock grid to generate a global clock and obtain different clock speeds by developing ratio clock speeds at a specific ratio to the global clock.

It is common to use external control signals to develop derivative clock speeds at a ratio to the global clock. Additionally, absent external control signals, derivative clock speeds are generally limited to having whole number ratios to the global clock of, for example, 2-to-1, 4-to-1, etc. Additionally, complex circuits used to generate derivative clock speeds may create a time delay between the global clock and the derivative clock.

Thus, to overcome the above mentioned problems, it is desirable to develop a system and method for local generation of a derivative clock speed having other than a whole number ratio to the global clock.

SUMMARY OF THE INVENTION

The shortcomings of the prior art are overcome and additional advantages are provided through the provision of a system for locally generating a ratio clock from a global clock based on a global clock gate signal. The system for locally generating a ratio clock from a global clock based on a global clock gate signal includes a staging unit, a pass gate, and a state machine. The state machine is electrically connected to an output of the staging unit and an input of the pass gate. The state machine includes state elements and associated logic. The associated logic is configured to allow said state elements to pass through a number of logic states for every same number of consecutive edges of the global clock when the associated logic is enabled. The number is a positive integer.

The shortcomings of the prior art are overcome and additional advantages are also provided through the provision of a method for locally generating a ratio clock from a global clock based on a global clock gate signal. The method for locally generating a ratio clock from a global clock based on a global clock gate signal includes capturing a global clock gate signal at a staging unit, enabling a state machine to generate the ratio clock at an integer over two ratio to the global clock, and passing the ratio clock through a passing gate electrically connected to the state machine. The state machine being electrically connected to the staging unit.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Embodiments of the invention include a system and method for producing a derivative clock (known as a 3-to-2 clock) from a global clock at a 1.5-to-1 ratio without using externally generated control signals. Thus, the 3-to-2 clock is locally generated to simplify an architecture of an integrated circuit chip (chip).

Figure 1:
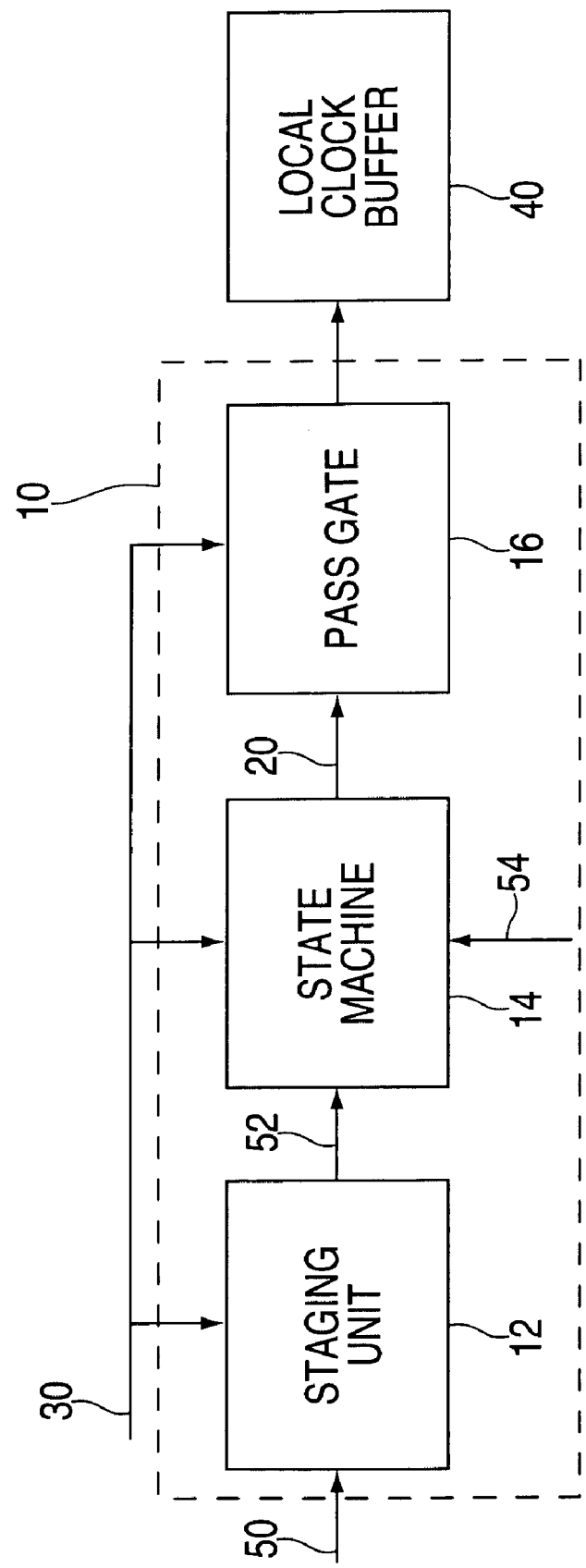
FIG. 1 illustrates a block diagram of a ratio clock generator according to an exemplary embodiment of the present invention.

FIG. 1 illustrates a block diagram of a ratio clock generator according to an exemplary embodiment of the present invention. The ratio clock generator 10 generates the 3-to-2 clock 20 from the global clock 30 at the 1.5-to-1 ratio. The ratio clock generator 10 includes a staging unit 12, a state machine 14, and a pass gate 16. In this exemplary embodiment, the ratio clock generator 10 is disposed in the architecture of the chip, such that the ratio clock generator 10 is electrically connected in series with a local clock buffer 40. For example, the ratio clock generator 10 is electrically disposed before the local clock buffer 40 from the perspective of other elements of the chip.

The local clock buffer 40 is any of a number of buffers or "clock splitters" well known in the art. The local clock buffer 40 typically receives and buffers a clock input. The local clock buffer 40 may contain latches or similar logic devices configured to split the clock input into derivative clocks at a 1-to-1 ratio to the clock input.

The staging unit 12 captures a control signal to control a function of the state machine 14. The staging unit 12 may include one or more latch elements. In an exemplary embodiment, the control signal includes a global clock gate signal 50. The global clock gate signal 50 controls a counting function of the state machine 14 and can be used to reset the state machine 14. The global clock gate signal 50 has a counting state and a non-counting state. When the global clock gate signal 50 is in the counting state, the state machine 14 is allowed to count. When the global clock gate signal 50 is in the non-counting state, the state machine 14 may be reset to a known starting state, thereby eliminating a need for an external synchronizing signal. Alternatively, an external synchronizing signal could be used to reset the state machine 14 to the known starting state. The staging unit 12 receives inputs including the global clock gate signal 50 and the global clock 30. The staging unit 12 captures the global clock gate signal 50 synchronously and at speed with respect to a clock grid. The staging unit 12 outputs a global clock gate delayed signal 52 to the state machine 14.

The global clock gate delayed signal 52 is a two state signal having either a high state or a low state to control the counting function of the state machine 14. For example, a high state of the global clock gate delayed signal 52 enables the counting function of the state machine 14, and a low state of the global clock gate delayed signal 52 disables the counting function of the state machine 14. The global clock gate delayed signal 52 has a state corresponding to a state of the global clock gate signal 50, but is synchronous with respect to the clock grid and sequentially delayed from the global clock gate signal 50 by one global clock 30 cycle.

Figure 2:
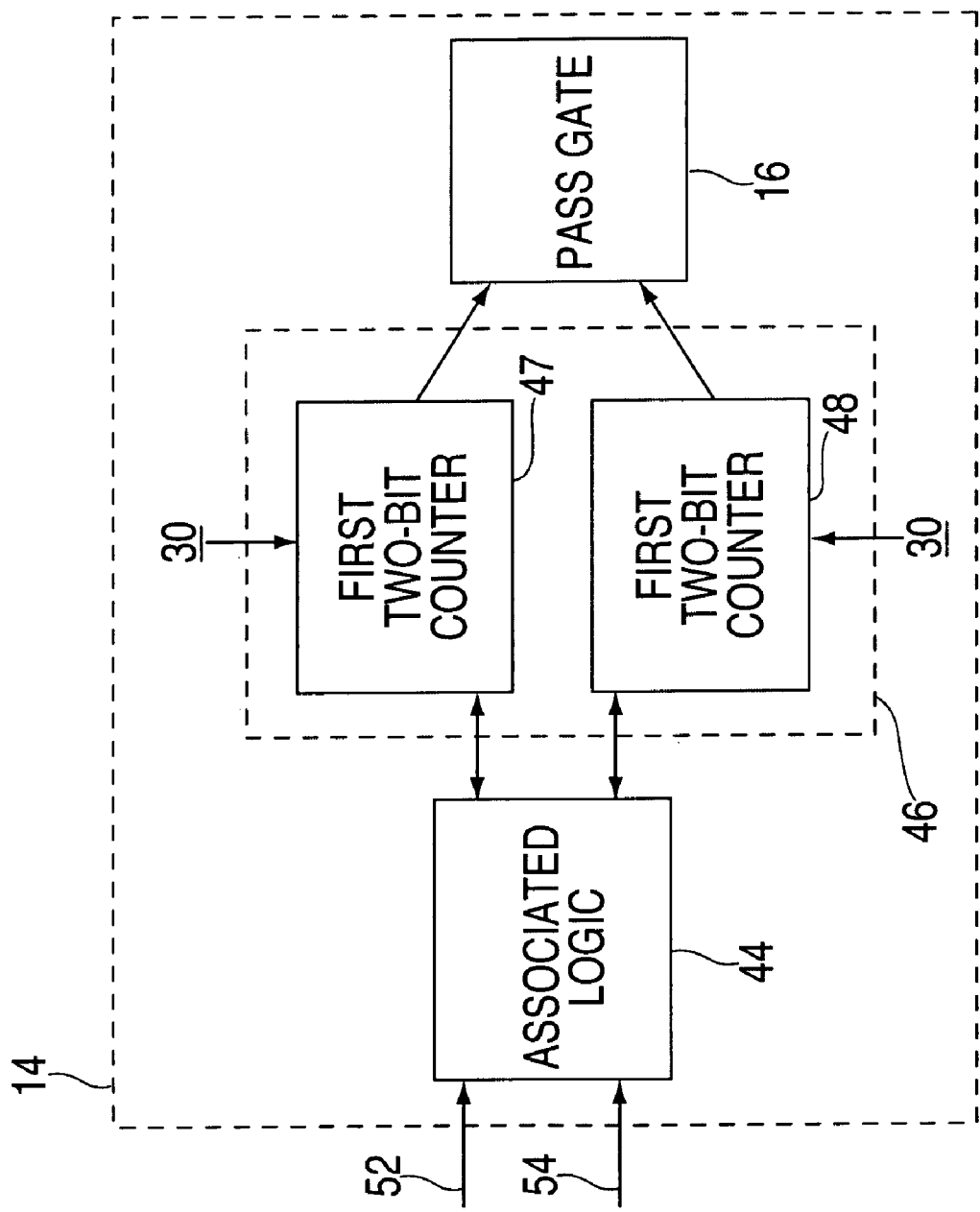
FIG. 2 illustrates a block diagram of a state machine according to an exemplary embodiment of the present invention.

The state machine 14 is electrically connected to the staging unit 12. FIG. 2 illustrates a block diagram of the state machine 14 according to an exemplary embodiment. Referring to FIGS. 1 and 2, the state machine 14 includes a number of state elements 46 and associated logic 44. The state elements 46 perform the counting function of the state machine 14 and include, for example, latches. A state machine 14 having state elements 46 including two latches may function as a two-bit counter. The two-bit counter may, for example, be configured to count one incremental logic state every clock edge. The two-bit counter configured as stated above counts four incremental logic states every two complete cycles of the global clock 30. For example, the two-bit counter counts in binary 0, 1, 2, 3, 0, 1, etc, entering a next incremental logic state on each edge of the global clock 30. The associated logic 44 is electrically connected to the state elements 46 and configured to control inputs to the state elements 46. A configuration of the associated logic 44 may be such that it controls which incremental logic states the state elements 46 pass through. In an exemplary embodiment, the associated logic 44 is configured to prevent the two-bit counter from achieving one of the four incremental logic states, thereby creating a "count-to-three counter" that counts in binary, for example, 0, 1, 2, 0, 1, etc. The count-to-three counter passes through (counts) three incremental logic states twice during three complete clock cycles of the global clock 30. Therefore, the output of the count-to-three counter goes through a complete cycle every one and one-half global clock 30 cycles (or a 1.5-to-1 ratio).

In an exemplary embodiment, the state machine 14 receives the global clock gate delayed signal 52 from the staging unit 12 and a 3-to-2 enable signal 54 (or ratio enable signal) as inputs to the associated logic 44. The associated logic 44 and state elements 46 are configured to pass through three incremental logic states only if both the global clock gate delayed signal 52 and the 3-to-2 enable signal 54 are at a high state. Thus, if both the global clock gate delayed signal 52 and the 3-to-2 enable signal 54 are at the high state, the state elements 46 passes through three incremental logic states for every one and one half cycles of the global clock 30 producing the 3-to-2 clock 20 at the 1.5-to-1 ratio. If one of the global clock gate delayed signal 52 and 3-to-2 enable signal 54 are low, the counting function of the associated logic 44 is disabled and the state elements 46 lock into a fixed reset state so that the state machine 14 passes the clock 20 substantially the same as the global clock 30 with a minimal time delay. In other words, when either the global clock gate delayed signal 52 or 3-to-2 enable signal 54 is low, the clock 20 is at a 1-to-1 ratio to the global clock 30.

The 3-to-2 enable signal 54 provides a mechanism to override the ratio clock generator 10 and ensure the global clock 30 is provided to the local clock buffer 40 with the minimal time delay. The 3-to-2 enable signal 54 may be provided by a direct current (DC) switch that is turned on to allow the ratio clock generator 10 to generate the 3-to-2 clock 20 having the 1.5-to-1 ratio when the global clock gate delayed signal 52 is at the high state, and turned off to ensure that the global clock 30 is provided to the local clock buffer 40 regardless of the state of the global clock gate delayed signal 52.

Referring still to FIGS. 1 and 2, the pass gate 16 is electrically connected to the state machine 14 and receives the 3-to-2 clock 20 from the state machine 14. The pass gate 16 is configured to pass the 3-to-2 clock 20 to the local clock buffer 40. In an exemplary embodiment, the state machine 14 includes state elements 46 that include a first two-bit counter 47 and a second two-bit counter 48. Additionally, the pass gate 16 multiplexes an output of the first and second two-bit counters 47 and 48 to avoid passing the output of one of the first and second two-bit counters 47 and 48 while the two-bit counter is changing states. The pass gate 16 multiplexes the output of the first and second two-bit counters 47 and 48 by alternating, on each edge of the global clock 30, which output of one of the first and second two-bit counters 47 and 48 is passed to the local clock buffer 40. In other words, for example, the pass gate 16 passes the output of one state element of the first two-bit counter 47, which is stable, while a corresponding state element of the second two-bit counter 48 changes states. Then, while the one state element of the first two-bit counter 47 changes states, the pass gate 16 passes the output of the corresponding state element of the second two-bit counter 48, which is stable. Thus, the local clock buffer 40 receives a stable clock 20 from the pass gate 16 and the clock 20 has either a 1-to-1 ratio or a 1.5-to-1 ratio to the global clock 30.

Figure 3:
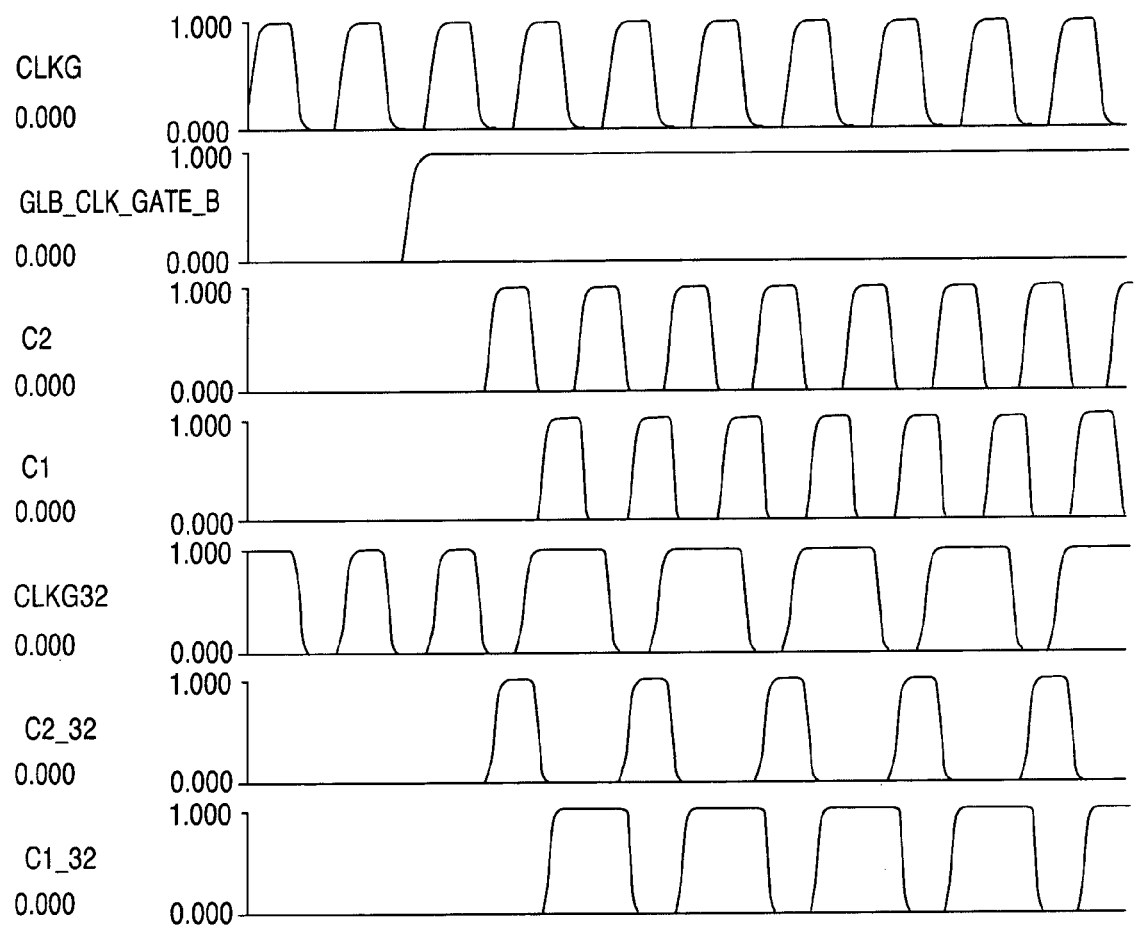
FIG. 3 illustrates a timing chart for the ratio clock generator of FIG. 1.

FIG. 3 shows a timing chart for the ratio clock generator of FIG. 1. Line CLKG shows the global clock 30 operating at a speed of the clock grid. Line GLB_CLK_GATE_B shows the global clock gate signal 50 transitioning from the low state to the high state. Lines C1 and C2 illustrate a first output and a second output, respectively, from the local clock buffer 40 when the global clock gate signal 50 is at the high level, but the 3-to-2 enable signal 54 is at the low level. When the 3-to-2 enable signal 54 is at the low level and the global clock gate signal 50 is at the high level, the local clock buffer 40 produces the first and second outputs at a 1-to-1 ratio to the global clock 30. Line CLKG32 illustrates the 3-to-2 clock 20. Prior to the global clock gate signal 50 shifting to the high level, the 3-to-2 clock 20 is substantially same as the global clock 30. However, when the global clock gate signal 50 shifts to the high level, the associated logic causes the state machine 14 to pass through three incremental logic states every one and one half cycles of the global clock 30 and thereby provides the 3-to-2 clock 20 at the 1.5-to-1 ratio. The pass gate 16 passes the 3-to-2 clock 20 to the local clock buffer 40. Lines C1_32 and C2_32 show the first and second outputs, respectively, when both the global clock gate signal 50 and the 3-to-2 enable signal 54 are at the high level.

Figure 4:
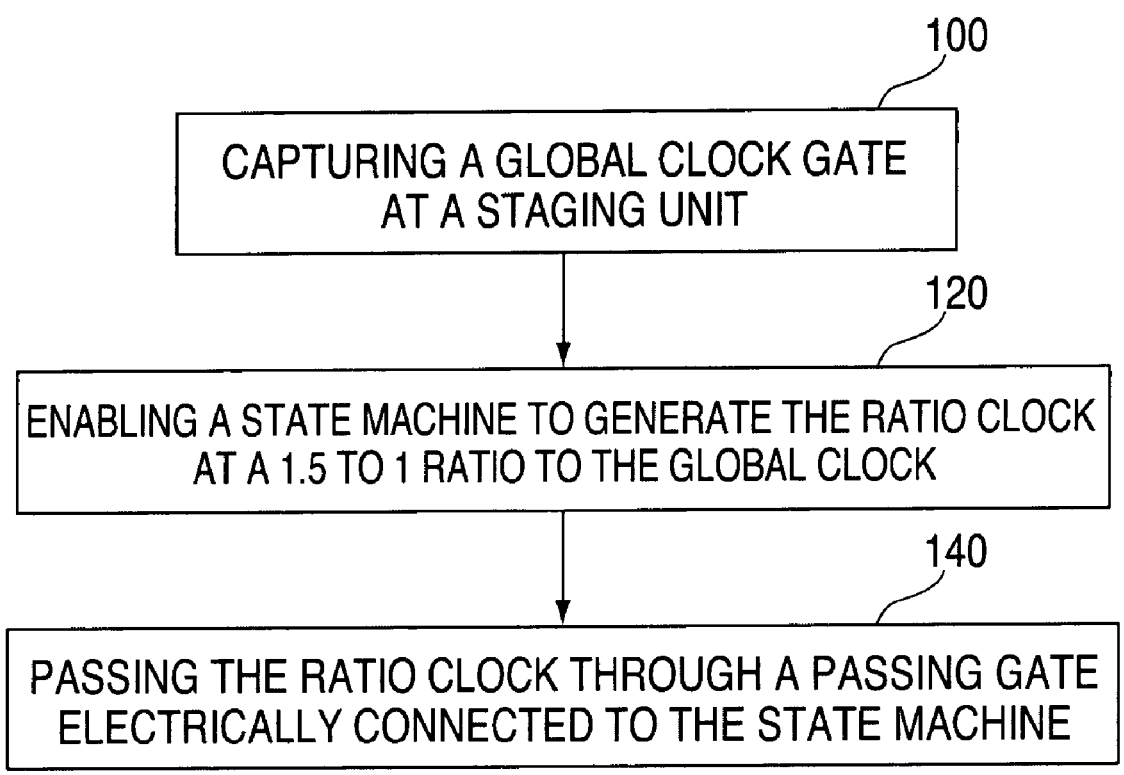
FIG. 4 illustrates a flow chart for a method of producing a ratio clock according to an exemplary embodiment of the present invention.

FIG. 4 illustrates a flow chart for a method of producing a ratio clock according to an exemplary embodiment of the present invention. The method includes capturing a global clock gate signal at 100, enabling a state machine to generate a ratio clock at a 1.5-to-1 ratio to a global clock at 120, and passing the ratio clock through a passing gate at 140.

Referring to FIGS. 1 and 4, step 100 includes capturing the global clock gate signal 50 synchronously and at speed with respect to the clock grid via a staging unit 12. Step 120 includes providing the 3-to-2 enable signal 54 and the global clock gate signal 50 at a corresponding level to enable the state machine 14 having state elements 46 and associated logic 44 to count to three for every one and one half cycles of the global clock 30. This can also be described as the state machine 14 will count to three for every three consecutive edges of the global clock 30. An edge being defined as either a 0 to 1 transition or a 1 to 0 transition of the global clock 30. Step 140 includes multiplexing the output of the state elements 46 including the first two-bit counter 47 and the second two-bit counter 48 of the state machine 14.

Although the above-described embodiment included the state machine 14 configured to count to three for every three edges of the global clock 30, it should be appreciated that the state machine 14 may also be configured to produce a ratio clock at any integer divided by two of the global clock 30. For example, the state machine 14 may include two three-bit counters with associated logic 44 enabling the state machine 14 to count to seven every seven edges of the global clock 30. This example would yield a 3.5 to 1 ratio clock. In fact, the state machine may be configured to any number of states n, for every n edges of the global clock where n is unlimited.

The flow diagram depicted herein is just an example. There may be many variations to the diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described. In addition, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for locally generating a ratio clock from a global clock based on a global clock gate signal, the system comprising:
   a staging unit;
   a pass gate; and
   a state machine electrically connected to an output of said staging unit and an input of said pass gate, said state machine including:
      state elements; and
      associated logic configured to allow said state elements to pass through a number of logic states for every same number of clock edges of the global clock when said associated logic is enabled, wherein said number may be a positive integer.

2. The system of claim 1, wherein said staging unit comprises latch elements.

3. The system of claim 1, wherein said staging unit is configured to synchronously capture the global clock gate signal.

4. The system of claim 1, wherein said staging unit produces a delayed global clock gate signal in response to the global clock gate signal.

5. The system of claim 4, wherein said associated logic is enabled in response to an enabling input from each of said delayed global clock gate signal and a ratio enable signal.

6. The system of claim 5, wherein said state elements include a two-bit counter and said associated logic allows said two-bit counter to pass through three logic states for each three consecutive edges of the global clock.

7. The system of claim 5, wherein said state machine passes an output at a 1-to-1 ratio to the global clock in response to a non-enabling input from one of said delayed global clock gate signal and said ratio enable signal.

8. The system of claim 5, wherein said ratio enable signal comprises an input from a direct current switch.

9. The system of claim 1, wherein said state elements include a first two-bit counter and a second two-bit counter.

10. The system of claim 9, wherein said associated logic allows each of said first and second two-bit counters to pass through three logic states for each three consecutive edges of the global clock.

11. The system of claim 10, wherein said pass gate passes a stable output from said first two-bit counter when said second two bit counter changes state, and passes a stable output from said second two-bit counter when said first two-bit counter changes state.

12. The system of claim 10, wherein said pass gate alternates between passing an output from said first two-bit counter and said second two-bit counter each edge of the global clock.

13. The system of claim 1, wherein said state machine is reset in response to a non-counting state of the global clock gate signal.

14. A method for locally generating a ratio clock from a global clock based on a global clock gate signal, the method comprising:
   capturing a global clock gate signal at a staging unit;
   enabling a state machine to generate the ratio clock at an integer over two ratio to the global clock, said state machine being electrically connected to said staging unit; and
   passing the ratio clock through a passing gate electrically connected to said state machine.

15. The method of claim 14, wherein capturing the global clock gate signal comprises capturing the global clock gate signal synchronously and at speed with respect to a clock grid via said staging unit.

16. The method of claim 14, wherein enabling said state machine comprises:
   providing a ratio enable signal at a corresponding level to enable said state machine; and
   providing the global clock gate signal at a corresponding level to enable said state machine, wherein said state machine has state elements and associated logic.

17. The method of claim 16, further comprising configuring said associated logic to permit said state elements to pass through three logic states for every three consecutive edges of the global clock.

18. The method of claim 16, further comprising configuring said associated logic to permit said state elements to pass through a number of logic states for every same number of consecutive edges of the global clock, wherein the number is a positive integer.

19. The method of claim 16, wherein passing the ratio clock through said passing gate includes multiplexing an output of said state elements including a first two-bit counter and a second two-bit counter.

20. The method of claim 19, wherein multiplexing said output of said state elements includes alternating between passing an output from said first two-bit counter and said second two-bit counter each consecutive edge of the global clock.

* * * * *